United States Patent
Lovich et al.

(10) Patent No.: US 9,838,848 B2
(45) Date of Patent: Dec. 5, 2017

(54) VENUE DATA PREFETCH

(71) Applicant: Apple Inc., Cupertino, CA (US)

(72) Inventors: Vitali Lovich, San Jose, CA (US);
Darin Tay, Sunnyvale, CA (US);
Robert Mayor, Half Moon Bay, CA (US); Joseph Ding-Jiu Huang, Kingston (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/866,769

(22) Filed: Sep. 25, 2015

(65) Prior Publication Data

US 2016/0360377 A1 Dec. 8, 2016

Related U.S. Application Data

(60) Provisional application No. 62/172,022, filed on Jun. 5, 2015.

(51) Int. Cl.
*H04W 24/00* (2009.01)
*H04W 4/02* (2009.01)
*H04W 4/04* (2009.01)

(52) U.S. Cl.
CPC ........... *H04W 4/028* (2013.01); *H04W 4/046* (2013.01); *H04W 24/00* (2013.01)

(58) Field of Classification Search
CPC ...... H04W 4/028; H04W 4/046; H04W 24/00
USPC .................................... 455/456.1–456.3, 457
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,320,939 B1 * | 11/2012 | Vincent | G01S 19/48 370/338 |
| 8,364,171 B2 | 1/2013 | Busch | |
| 8,369,264 B2 | 2/2013 | Brachet et al. | |
| 8,478,297 B2 | 7/2013 | Morgan et al. | |
| 8,836,580 B2 | 9/2014 | Mendelson | |
| 8,866,673 B2 | 10/2014 | Mendelson | |
| 8,896,485 B2 | 11/2014 | Mendelson | |
| 8,897,808 B2 | 11/2014 | Farris | |
| 8,941,485 B1 | 1/2015 | Mendelson | |

(Continued)

*Primary Examiner* — Mong-Thuy Tran
(74) *Attorney, Agent, or Firm* — Fish & Richardson P.C.

(57) ABSTRACT

Methods, systems, and computer program product for prefetching location data based on predicted user behavior. A mobile device can request, from a user routine subsystem of the mobile device, a list of locations that a user of the mobile device routinely visits while the user carries the mobile device. The mobile device can determine a cluster of these locations that are within a specified distance between one another. The mobile device can request location data for these locations from a location server, even if the user is not at one of these locations. The location data can include a venue map and a venue location fingerprint. Upon detecting that the user entered a venue at one of these locations, the mobile device can determine a location of the user inside of the venue using the venue location fingerprint. The mobile device can then display the location on a venue map.

15 Claims, 9 Drawing Sheets

(56) References Cited

U.S. PATENT DOCUMENTS

| | | | |
|---|---|---|---|
| 8,983,493 B2 | 3/2015 | Brachet et al. | |
| 9,020,687 B2 | 4/2015 | Mendelson | |
| 9,140,570 B1* | 9/2015 | Baird | G01C 21/3446 |
| 9,204,251 B1 | 12/2015 | Mendelson | |
| 9,204,257 B1 | 12/2015 | Mendelson | |
| 9,256,615 B2* | 2/2016 | Rados | G06F 17/30241 |
| 9,432,961 B2 | 8/2016 | Rao et al. | |
| 9,568,331 B1* | 2/2017 | Narang | G01C 21/3617 |
| 2007/0069923 A1* | 3/2007 | Mendelson | G01C 21/206 340/988 |
| 2010/0304756 A1* | 12/2010 | Yang | H04W 64/00 455/456.1 |
| 2011/0184945 A1* | 7/2011 | Das | G01C 21/206 707/724 |
| 2012/0044265 A1* | 2/2012 | Khorashadi | G01C 21/206 345/641 |
| 2012/0064855 A1 | 3/2012 | Mendelson | |
| 2012/0088525 A1* | 4/2012 | Kurokawa | H04W 4/028 455/456.5 |
| 2012/0108259 A1* | 5/2012 | Weiss | G06Q 30/0261 455/456.1 |
| 2012/0313777 A1* | 12/2012 | Zazula | G06Q 10/109 340/539.13 |
| 2013/0252638 A1* | 9/2013 | Yang | H04W 4/028 455/456.3 |
| 2014/0039792 A1* | 2/2014 | Seetharam | G01C 21/3679 701/538 |
| 2014/0066101 A1* | 3/2014 | Lyman | H04W 4/001 455/456.3 |
| 2014/0162693 A1 | 6/2014 | Wachter et al. | |
| 2014/0172576 A1* | 6/2014 | Spears | G06Q 30/0266 705/14.63 |
| 2014/0200038 A1 | 7/2014 | Rao et al. | |
| 2014/0213300 A1* | 7/2014 | Spears | H04W 4/022 455/456.3 |
| 2014/0274156 A1 | 9/2014 | Wilson | |
| 2015/0031400 A1* | 1/2015 | Tian | H04W 4/028 455/456.3 |
| 2015/0046602 A1* | 2/2015 | Lee | H04L 67/1095 709/248 |
| 2015/0100271 A1 | 4/2015 | Wang et al. | |
| 2015/0172865 A1* | 6/2015 | Emadzadeh | H04W 4/023 455/457 |
| 2015/0237470 A1* | 8/2015 | Mayor | H04W 4/021 455/456.2 |
| 2015/0264532 A1* | 9/2015 | Spears | H04W 4/028 455/456.3 |
| 2016/0205657 A1 | 7/2016 | Rao et al. | |
| 2016/0321551 A1* | 11/2016 | Priness | G06N 5/047 |

\* cited by examiner

VENUE DATA PREFETCH

CROSS-REFERENCE TO RELATED APPLICATION

This application claims priority to U.S. Provisional Patent Application No. 62/172,022, entitled "Venue Data Prefetch," filed Jun. 5, 2015, the entire contents of which are incorporated herein by reference.

TECHNICAL FIELD

This disclosure relates generally to location determination.

BACKGROUND

People often carry mobile devices to venues such as office buildings, stadiums or shopping centers. In a venue, various walls, doors, hallways or stairs limit people's movement. A mobile device can display a map of a venue and a location of the mobile device on the map, if the mobile device has the map and can determine the location. A mobile device may visit many venues. Storing maps including detailed structural information of venues that the mobile device may visit on the mobile device can take up much resource on the mobile device. Downloading venue information for each venue in real time when the mobile device visits that venue may be impractical. This can be due to unreliable wireless data transmission or high cellular data transmission cost.

SUMMARY

Techniques for prefetching venue data based on predicted user behavior are disclosed. A mobile device can request, from a user routine subsystem of the mobile device, a list of locations that a user of the mobile device routinely visits while the user carries the mobile device. The mobile device can determine a cluster of these locations that are within a specified distance between one another. The mobile device can request venue data for these locations from a location server, even if the user is not at one of these locations. The venue data can include a venue map and a venue location fingerprint for each location. Upon detecting that the user entered a venue at one of these locations, the mobile device can determine a location of the user inside of the venue using the venue location fingerprint. The mobile device can then display the location on a venue map.

The features described in this specification can be implemented to achieve various advantages. For example, compared to conventional techniques for storing venue data of all venues on a mobile device, the techniques disclosed in this specification allow a mobile device to store venue data only for those venues that the mobile device determines that a user is likely to visit, thereby saving storage space. Compared to conventional techniques of downloading venue data only upon determining that the user entered a venue, the techniques disclosed in this specification allow a mobile device to fetch venue data before the user arrives at a venue and at a time that is most convenient (e.g., when fast Wi-Fi™ connections are available), thereby avoiding having to download data at a time when wireless connection is slow or expensive (e.g., through cellular network with bandwidth limit).

The details of one or more implementations of the techniques are set forth in the accompanying drawings and the description below. Other features, aspects and advantages of the indoor location survey techniques will become apparent from the description, the drawings and the claims.

BRIEF DESCRIPTION OF THE DRAWINGS

Like reference symbols in the various drawings indicate like elements.

DETAILED DESCRIPTION

Exemplary Venue Data Prefetching

Figure 1:
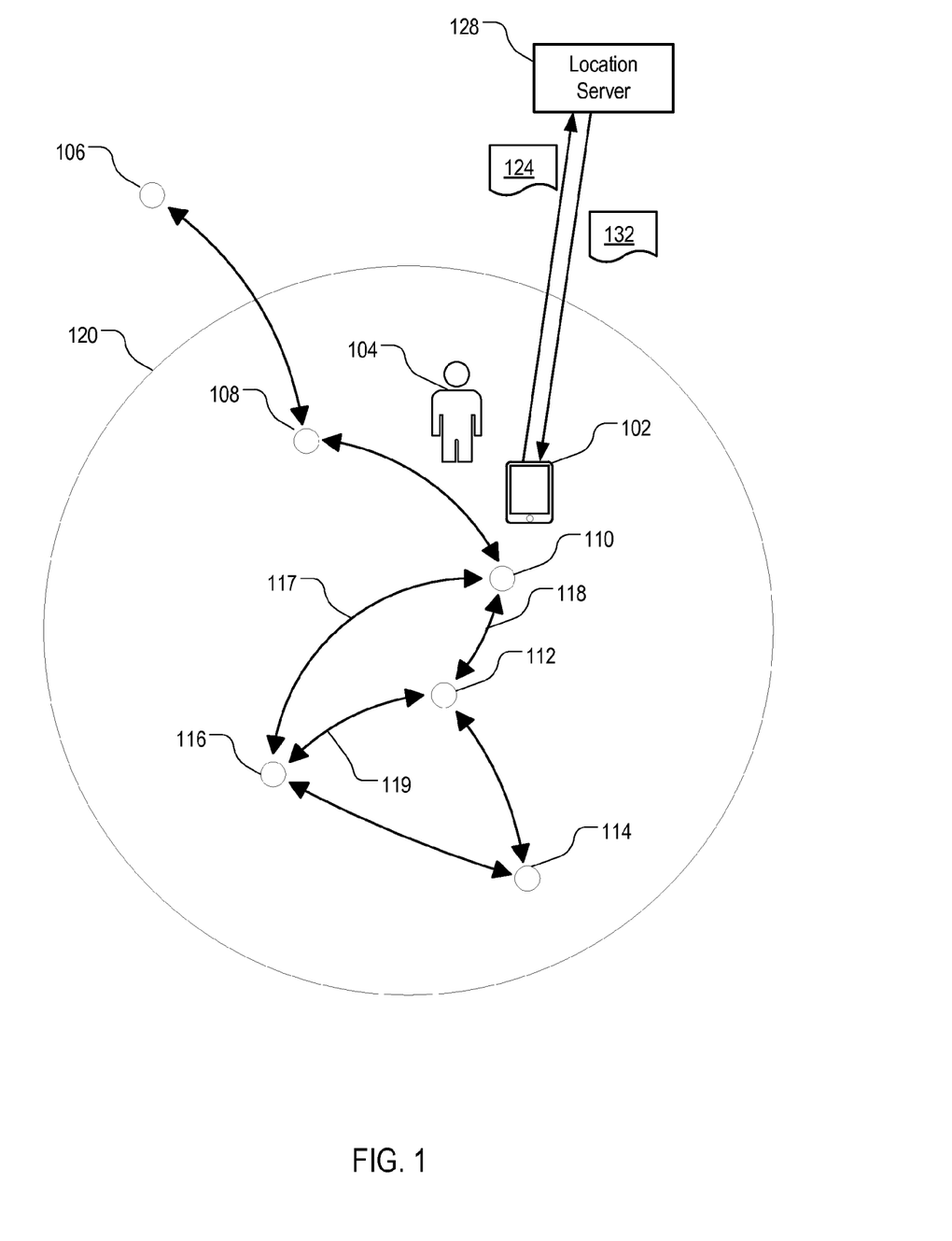
FIG. 1 is a diagram illustrating example venue data prefetching based on locations of interests.

FIG. 1 is a diagram illustrating example venue data prefetching based on locations of interests. Mobile device 102 can be carried by user 104 to various locations. A user routine subsystem (also referred to as a core routine subsystem) of mobile device 102 can record the locations visited on mobile device 102. The user routine subsystem can determine that, among various locations mobile device 102 has visited, locations 106, 108, 110, 112, 114 and 116 are locations of interests (LOIs, also referred to as routine locations). An LOI can be a geographic location that is determined to have a significant meaning to user 104 of mobile device 102 such that user 104 is likely to visit the location in the future. Mobile device 102 can determine LOIs 106, 108, 110, 112, 114 and 116 based on frequency of past visits of mobile device 102 to locations 106, 108, 110, 112, 114 and 116. Mobile device 102 can transition from one LOI to another, from an LOI to another location, or to another location to a LOI. For example, mobile device 102 can travel from LOI 110 to LOI 116 through path 117 or paths 118 and 119. Mobile device 102 can designate a location previously not significant to user 104 as an LOI if user 104 starts to visit that location regularly.

Mobile device 102 can determine one or more clusters (e.g., cluster 120) of LOIs previous determined by mobile device 102. Cluster 120 can include a group of LOIs. Mobile device 102 can determine cluster 120 upon determining that at least a threshold number of LOIs are located within a threshold distance from one another. Mobile device 102 can designate the LOIs that are located within a threshold distance from one another as LOIs in the cluster, e.g., cluster 120. In the example shown, cluster 120 includes LOIs 108, 110, 112, 114 and 116.

Mobile device 102 can determine cluster 120 using various clustering techniques. Mobile device 102 can use current location of user 104 as a parameter of the clustering.

Cluster 120 can overlap with another cluster of LOIs. Additional details and examples of creating and managing clusters are described below in reference to FIG. 6B.

Mobile device 102 can determine that mobile device 102 is located within cluster 120 at a given time. Mobile device 102 can make the determination upon determining that mobile device 102 is located within a threshold radius from a centroid of cluster 120. Mobile device 102 can determine the centroid from the LOIs in the group. Mobile device 102 can determine the threshold radius based on a user travel pattern, e.g., a maximum distance that the user of mobile device 102 is likely to travel in a given time period. For example, mobile device 102 can determine that the radius is a maximum distance that the user can travel by a motor vehicle in one day, e.g., 50 kilometers, 200 kilometers or 300 kilometers. The radius of the cluster may or may not be the same as the threshold distance for forming the cluster. Mobile device 102 may choose a threshold distance that is smaller than the radius.

Upon determining that mobile device 102 is located within cluster 120, mobile device 102 can obtain venue data for each LOI in cluster 120. Mobile device 102 can submit request 124 to location server 128 through a communications network. Request 124 can include a list of LOIs 108, 110, 112, 114 and 116. LOIs 108, 110, 112, 114 and 116 can be represented in request 124 by identifiers or geographic coordinates. In response, location server 128 can provide venue data 132 for each of LOIs 108, 110, 112, 114 and 116, if available.

Upon receiving an identifier or geographic coordinates for a location, location server 128 can determine whether that location is within the boundary of a venue, and whether location server 128 has venue data 132 for that venue. A venue can be a structure (e.g., a building) accessible by a pedestrian. Data for a venue can include a location fingerprint for the venue that indicates, for example, expected wireless signal measurements at various locations in the venue. Venue data 132 can include a map of the venue. Venue data 132 can include venue floor data, including floor plan for each floor, and wireless access points detectable at each floor. Location server 128 can acquire venue data 132 by performing one or more surveys for each venue.

Upon receiving venue data 132, mobile device 102 can store venue data 132 on mobile device 102. Upon entering a LOI 108, 110, 112, 114 or 116, mobile device 102 can determine if venue data for that LOI is available. If yes, mobile device 102 can determine a location of mobile device 102 in that venue using the location fingerprint data in venue data 132. The location can indicate, for example, on which floor, in which room, which hallway or which lobby mobile device 102 is located. Mobile device 102 can display a map of that venue, and display a representation of the location of mobile device 102 on the map.

Mobile device 102 can transition from one LOI to another. For example, mobile device 102 can travel from LOI 110 to LOI 116. Upon transitioning from LOI 110 to LOI 116, mobile device 102 can enter a venue at LOI 116. LOI 116 being inside cluster 120, mobile device 102 already stores venue data for the venue at LOI 116, including location fingerprint data and a venue map. Mobile device 102 can determine a location of mobile device 102 inside the venue and display the location on the venue map without having to download the venue data again. If mobile device 102 moves from LOI 110 to LOI 106 that is outside of cluster 120, mobile device 102 may request a venue data update.

Venue data 132 is used as an example in FIG. 1. In addition to venue data, mobile device 102 can prefetch various location data related to cluster 120. The location data can include location-specific information on each LOI in cluster 120. The information can include data or application programs.

Figure 2:
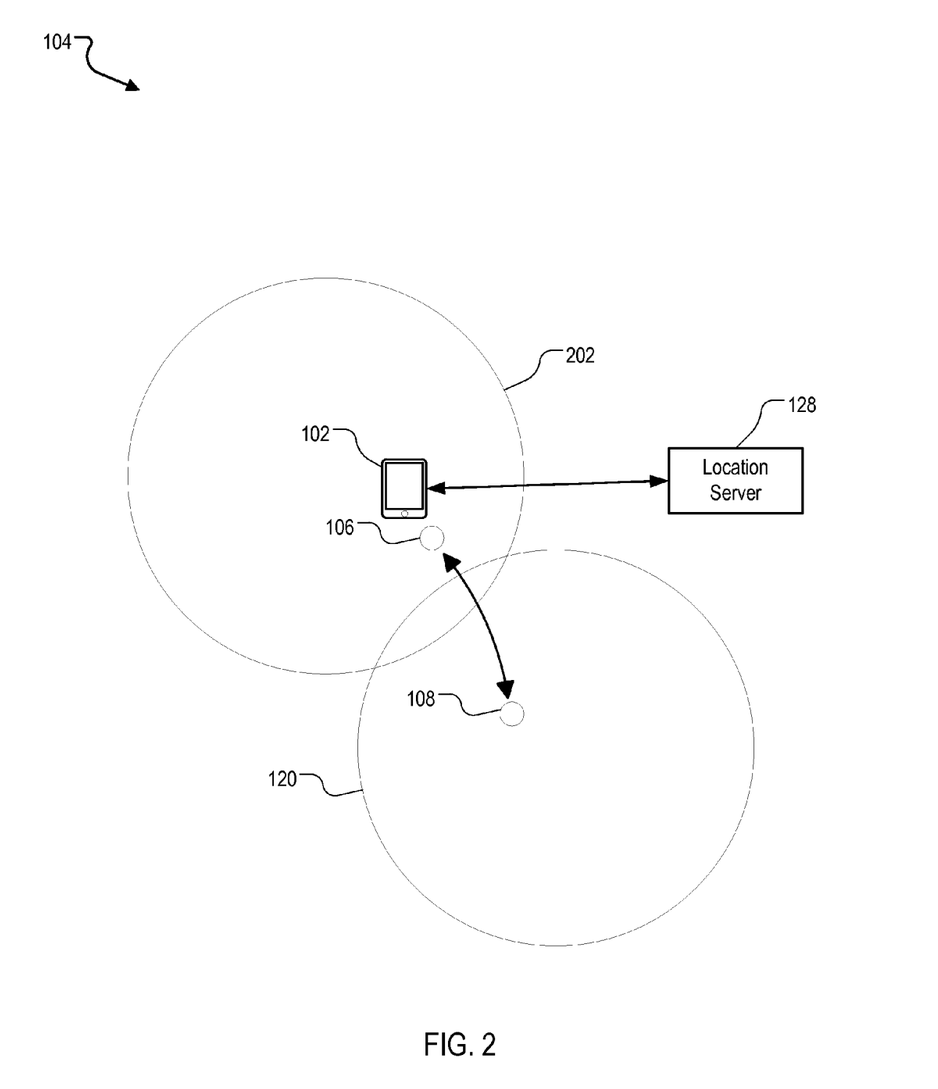
FIG. 2 is a diagram illustrating an example venue data update.

FIG. 2 is a diagram illustrating an example venue data update. Mobile device 102 can prefetch venue data of a venue before mobile device 102 visits that venue. Mobile device 102 can update the prefetched data in various manners. In some implementations, mobile device 102 can update the prefetched venue data periodically. Mobile device 102 can determine periodically (e.g., daily) whether mobile device 102 is outside of a cluster of LOIs for which mobile device 102 already prefetched venue data. For example, after prefetching venue data for cluster 120, mobile device 102 can determine, at a predetermined and user configurable time (e.g., midnight) whether a distance between mobile device 102 and a centroid of cluster 120 is greater than the threshold radius (e.g., 200 kilometers). If yes, mobile device 102 can determine new cluster 202 of LOIs, and prefetch venue data for LOIs in new cluster 202.

For example, mobile device 102 can determine that mobile device 102 has travelled to LOI 106, 350 kilometers from the centroid, farther away than a 200 kilometer radius. Mobile device 102 can then determine new cluster 202. Determining new cluster 202 can include clustering LOIs using various techniques, where mobile device 102 uses a new location of mobile device 102 (e.g., LOI 106) as a parameter of clustering. New cluster 202 may or may not overlap cluster 120. To trigger mobile device 102 to determine new cluster 202 and to fetch of new venue data, mobile device 102 need not travel more than the threshold radius of cluster 120. For example, traveling from LOI 108 to LOI 106 can trigger the update, if LOI 108 is at the edge of cluster 120 and LOI 106 is farther away from the centroid than LOI 108 is.

Example Venue Data

Figure 3:
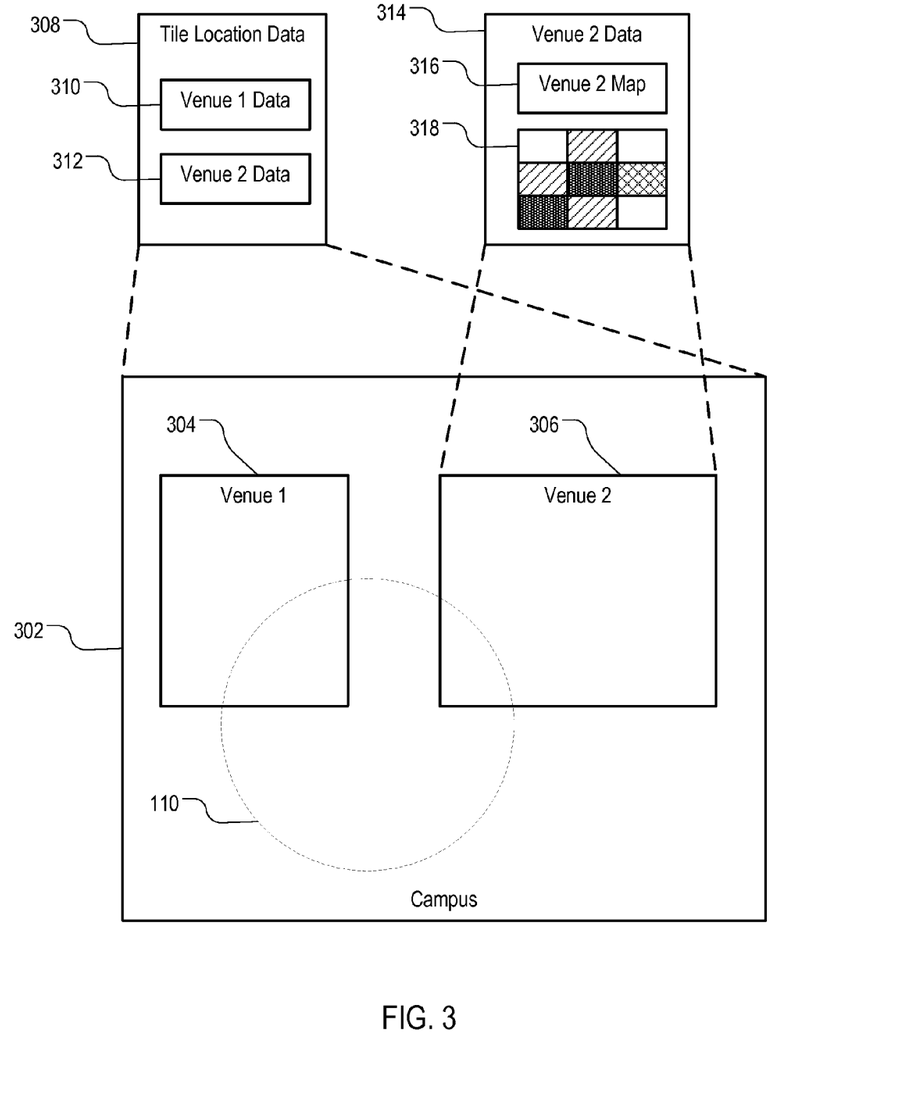
FIG. 3 is a diagram illustrating tiered data delivery in venue data prefetching.

FIG. 3 is a diagram illustrating tiered data delivery in venue data prefetching. Mobile device 102 can pre-fetch venue data by tiles. A tile can be a geographic area that is treated as a unit in data delivery.

For example, mobile device 102 can fetch venue data for cluster 120 of LOIs including LOI 110. Mobile device 102 can submit a location request including geographic coordinates of LOI 110 to a location server, e.g., location server 128. Location server 128 can determine that LOI 110 geographically correspond to tile 302. Tile 302 can be a geographic area that corresponds to a campus of, for example, an office compound, a university or a shopping mall. In the example shown, two venues, venue 304 and venue 306 are located in tile 302.

Each of venue 304 and venue 306 can be a space accessible by a pedestrian. Each of venue 304 and venue 306 can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). Each of venue 304 and venue 306 can be a physical structure. The physical structure can be closed (e.g., an office building) or open (e.g., an open stadium). The space can be indoor space inside of the physical structure, or if the physical structure is open, space inside of a bounding space of the physical structure.

Each of venue 304 and venue 306 can be mobile (e.g., an airplane, a cruise ship or a mobile oil platform).

Upon receiving the location request, location server 128 can provide tile location data 308 to mobile device 102 as a response. Tile location data 308 can include coarse location data 310 for venue 304 and coarse location data 312 for venue 306. Each of coarse location data 310 and 312 can include a respective identifier for venues 304 and 306, and a two-dimensional or three-dimensional bounding box corresponding to space that venues 304 and 306 occupy on Earth. For example, the coarse location data of venue 304 can include bounding box that encloses venue 304. Mobile device 102 can use the bounding boxes to determine whether to request venue data from location server 128.

Using the bounding boxes in tile location data 308, mobile device 102 can determine that mobile device entered venue 306. Upon determining that mobile device 102 entered venue 306, mobile device 102 can request detailed venue data 314. Detailed venue data 314 corresponding to venue 306 can include venue map 316 and location fingerprint 318. Venue map 316 can include a map of internal structures of venue 306, including a floor plan for each floor of venue 306. Location fingerprint 318 can include expected measurements of various signal sources (e.g., wireless access points of a Wi-Fi™ network) at each location inside venue 306. Mobile device 102 can use detected signals and location fingerprint 318 to determine a location inside venue 306.

In some implementations, during prefetching of venue data, location server 128 can provide detailed venue data 314 to mobile device 102 as part of tile location data 308. Accordingly, mobile device 102 can store detailed location data for each venue in cluster 120 of LOIs after a successful prefetch. After storing the detailed location data, mobile device 102 can request venue data from location server 128 only during a venue data update, if mobile device 102 visits a venue outside of cluster 120 or if mobile device 102 visits a venue that is not located at an LOI.

Exemplary Device

Figure 4:
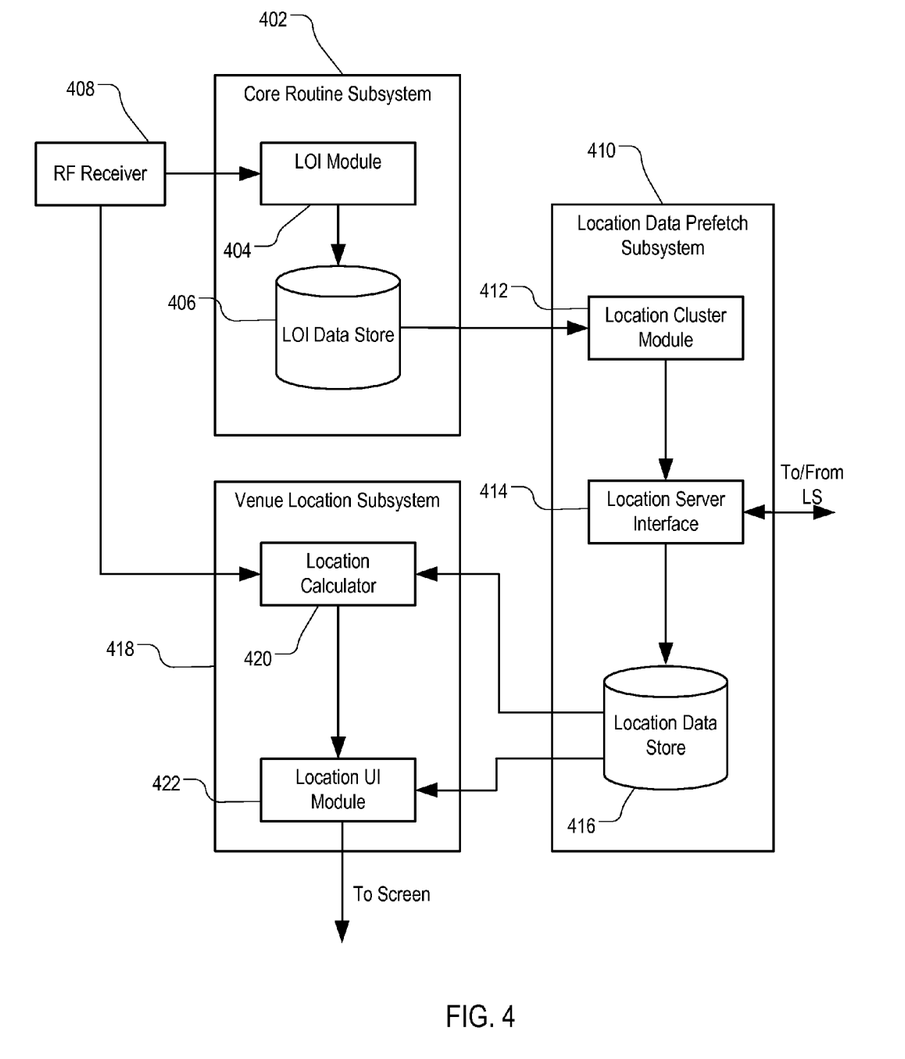
FIG. 4 is a block diagram illustrating components of an example mobile device implementing venue data prefetching.

FIG. 4 is a block diagram illustrating components of example mobile device 102 implementing venue data prefetching. Each component of mobile device can include a combination of hardware, software and firmware subcomponents.

Mobile device 102 can include core routine subsystem 402. Core routine subsystem 402 is a component of mobile device 102 configured to determine one or more LOIs, including LOIs 106, 108, 110, 112, 114, and 116. Core routine subsystem 402 can include LOI module 404 and LOI data store 406. LOI module 404 is a component of core routine subsystem 402 configured to determine a location of mobile device 102 using various technologies. For example, LOI module 404 can determine a location using known locations of wireless access points detected by radio frequency (RF) receiver 408. LOI module 404 can then determine that the location is an LOI upon determining that mobile device 102 visited that location for more than a threshold number of times during a time period. LOI module 404 can then store data representing the LOI, including an identifier, geographic coordinates and a size (e.g., radius) of the location in LOI data store 406.

Mobile device 102 can include location data prefetch subsystem 410. Location data prefetch subsystem 410 is a component of mobile device configured to prefetch location data for LOIs before mobile device 102 visits anyone of the LOIs. Location data prefetch subsystem 410 can include location cluster module 412. Location cluster module 412 is a component of location data prefetch subsystem 410 configured to determine a cluster of LOIs (e.g., cluster 120). Location cluster module 412 can determine a frequency (e.g., daily) of prefetching the venue data. At given time (e.g., midnight every day), location cluster module 412 can determine whether mobile device 102 has moved out of a cluster. If yes, location cluster module 412 can cause location interface 414 to request venue data from a location server. In some implementations, location cluster module 412 can cause location interface 414 to request venue data upon determining that mobile device 102 moved out of a cluster, regardless of whether the time is the given time.

Location interface 414 is a component of venue data subsystem configured to submit a request to a location server, and receive venue data from the location server in response. The request can include geographic coordinates of the LOIs in a cluster. The received venue data can include tiled location data or detailed venue data or both. Upon receiving the venue data, location interface 414 can store the venue data in location data store 416.

Mobile device 102 can include venue location subsystem 418. Venue location subsystem 418 is a component of mobile device 102 configured to determine a location of mobile device 102 inside of a venue. Venue location subsystem 418 can include location calculator 420. Location calculator 420 is a component of venue location subsystem 418 configured to determine the location using wireless signals from signal sources including wireless access points. Location calculator 420 can receive identifiers (e.g., media access control (MAC) addresses) of detected signal sources from RF receiver 408, receive measurements (e.g., received signal strength indicators or RSSIs) of the detected signals. Location calculator 420 can then determine a probability distribution of various possible locations of mobile device 102 using location fingerprint data retrieved from location data store 416. Location calculator 420 can then estimate a location of mobile device 102 based on the probability distribution.

Venue location subsystem 418 can include location user interface module 422. Location user interface module 422 is a component of venue location subsystem 418 configured to retrieve a venue map from location data store 416. Location user interface module 422 can receive a location of mobile device 102 inside a venue. Location user interface module 422 can then display the location of mobile device 102 on the venue map on a display device (e.g., a touch sensitive screen or other display surface) of mobile device 102.

Example User Interface

Figure 5:
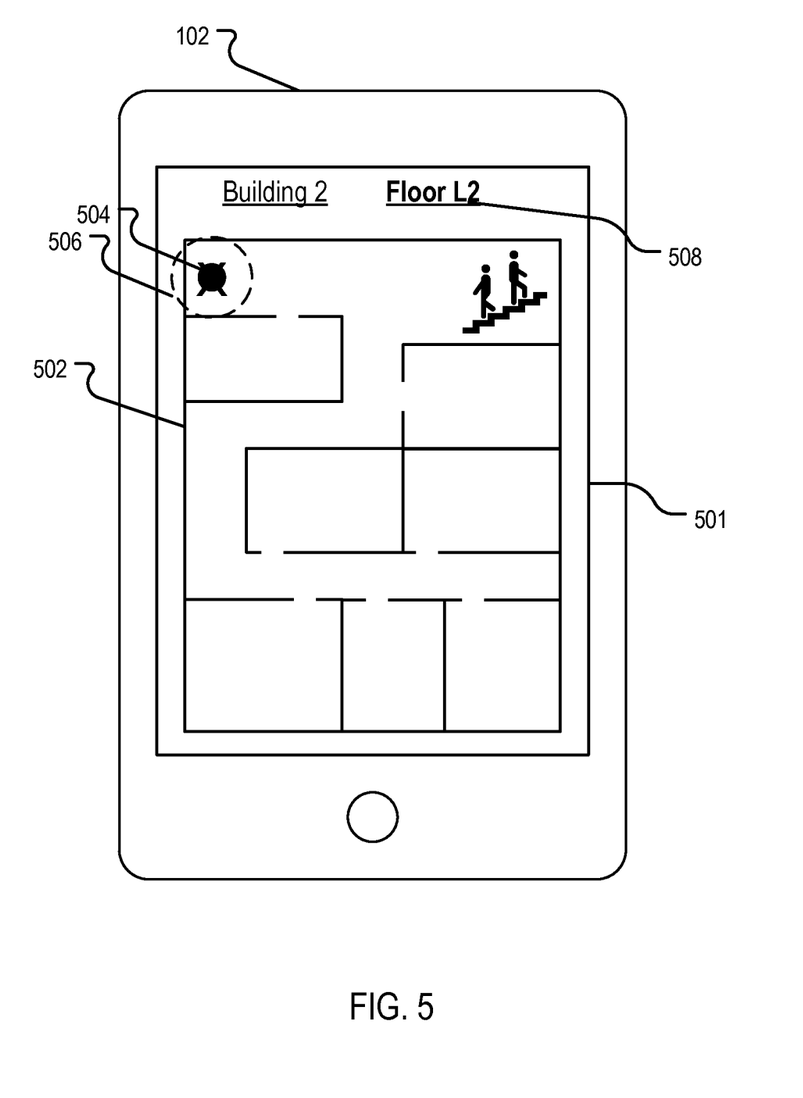
FIG. 5 is an example user interface for displaying a location on a venue map.

FIG. 5 is an example user for displaying a location on a venue map. Mobile device 102 can include display surface 501. Display surface 501 can include a display screen. Mobile device 102 can move between locations. For example, mobile device 102 can move between venues at LOIs 110, 112, 114 and 116. Mobile device 102 can prefetch venue data for these venues.

While mobile device 102 moves into a venue located at a LOI, mobile device 102 can determine a location of mobile device 102 in the venue, and determine a floor level on which mobile device 102 is located. While mobile device 102 into the venue, mobile device 102 can display map 502 of the venue. Map 502 can include a floor plan of a current floor level (e.g., ground floor) of mobile device 102. Mobile device 102 can display marker 504 indicating the location, and uncertainty indicator 506 to indicate a radius of uncertainty of the location. Upon determining mobile device 102 moved up or down to a different floor, mobile device 102 can automatically update map 502 to display a new floor plan. Mobile device 102 can display respective floor indicator 508 (e.g., a label) in association with each floor plan.

If mobile device 102 moves to another LOI inside of a current cluster, mobile device 102 can display a new venue map. Since the venue map has been prefetched, mobile device 102 need not communicate with a location server each time mobile device enters a new venue.

Example Procedures

Figure 6A:
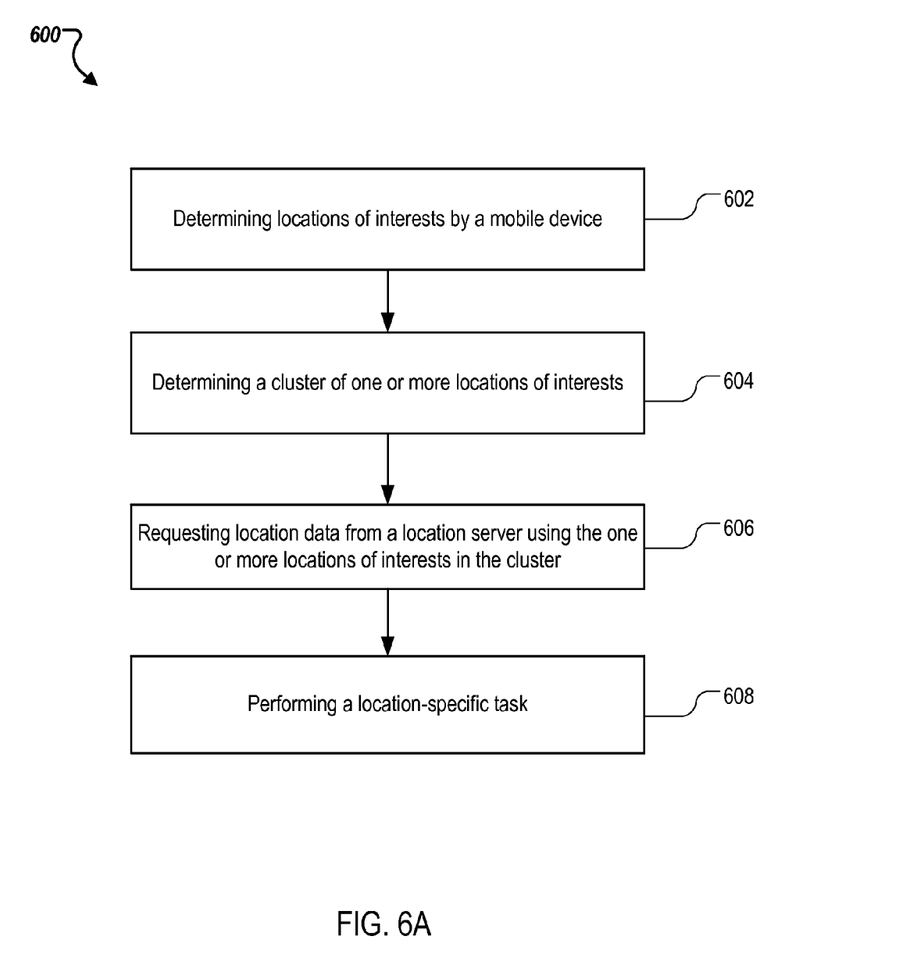
FIG. 6A is a flowchart of an example process of location estimation.

FIG. 6A is a flowchart of example process 600 of location estimation. Process 600 can be performed by mobile device 102.

Mobile device 102 can determine (602) LOIs using data from a user routine determination component of mobile device 102. The user routine determination component can include core routine subsystem 402. Each LOI can include a location that, according to the data from the user routine determination component of mobile device 102, a user of mobile device 102 is likely to visit. Each LOI can be at least one of a location that the user visited multiple times in the past, a location at which the user is presently located, or a location that the user routine determination component of the mobile device has determined that the user will visit in the future Mobile device 102 can determine (604) a cluster of one or more LOIs from the LOIs determined using the data from the user routine determination subsystem. In some implementations, determining the cluster can be based on a user movement radius. The user movement radius can correspond to a distance that the user is able to travel in a specified time span. The user movement radius can be a radius from a centroid of the one or more LOIs. Determining the cluster of one or more LOI is further based on a current location of mobile device 102. Mobile device 102 can require that an area that encloses the cluster of one or more LOIs cover the current location. The time span can correspond to a time interval (e.g., one day) between the mobile device requests venue data.

Mobile device 102 can request (606) location data from a location server using the one or more LOIs in the cluster prior to visiting the one or more locations of interests by mobile device 102. The location data can include various location dependent information. For example, the location data can include application programs specific to an LOI. The location data can include venue data including location fingerprint data of one or more venues. Each of the one or more venues can correspond to a respective LOI. The venue data can include respective location fingerprint data for each venue. Each venue can include a space accessible by a pedestrian. The venue data can include a venue map representing constraints in each venue that limit movement of the pedestrian. Determining the cluster and requesting the venue data can occur at a pre-determined interval or upon detecting that mobile device 102 moved out of an area covering the cluster of one or more LOIs Mobile device 102 can perform (608) a task that is specific to an LOI among the one or more LOIs in the cluster upon determining that mobile device 102 is visiting the LOI. The task can include estimating a location of mobile device 102 inside a venue located at the LOI being visited. Mobile device 102 can provide for display on a display surface of mobile device 102 a map of the venue and presenting for display the location inside the venue on the map.

Figure 6B:
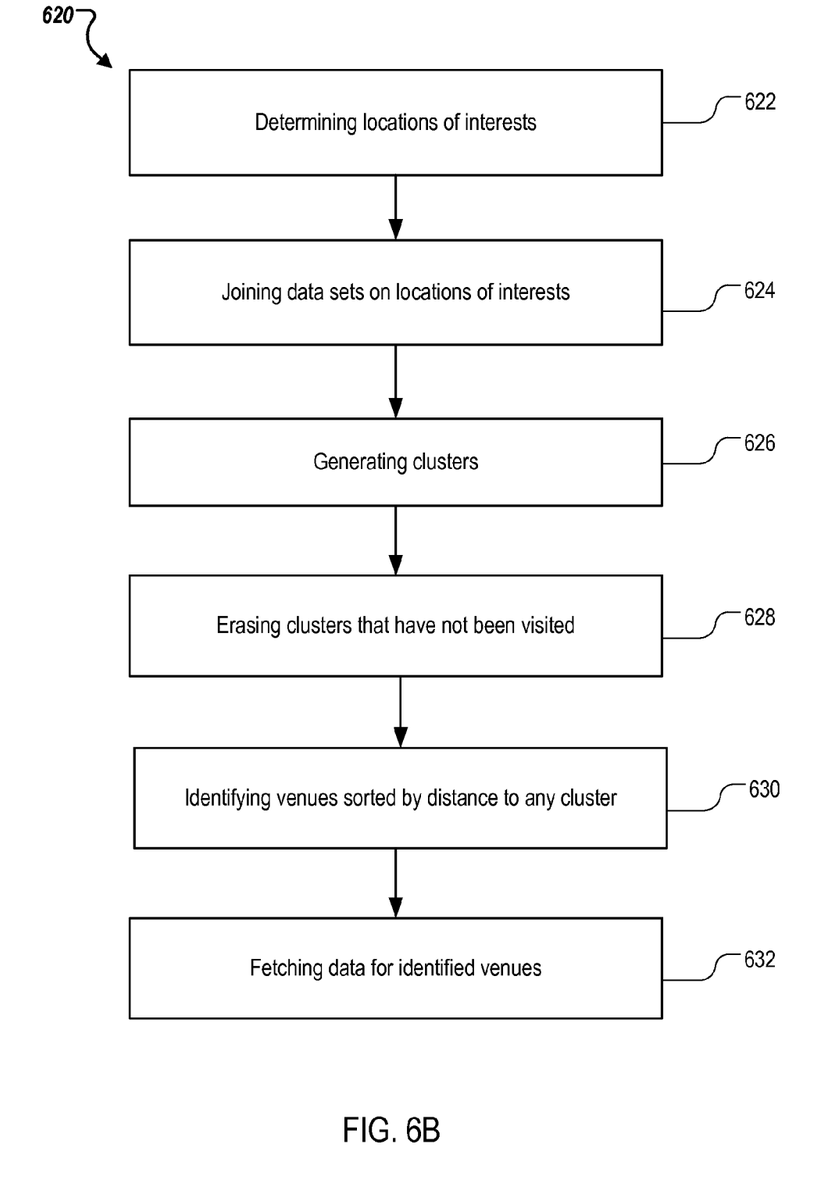
FIG. 6B is a flowchart of an example process of cluster generation.

FIG. 6B is a flowchart of example process 620 of cluster generation. Process 620 can be performed by mobile device 102.

Mobile device 102 can determine (622) multiple LOIs. Determining the LOIs can include predicting locations that will be visited until the next time mobile device 102 prefetches data. The prefetch can occur daily (every 24 hours). Mobile device 102 can sort the predicted location by time of expected visit, e.g., a location that is predicted to be visited sooner (referred to as a sooner prediction) is ahead of a location that is predicted to be visited later (referred to as a later prediction). Mobile device 102 can determine a location that is to be visited based on past user behavior (e.g., a particular user has traveled to that location in the past), crowd-sourced data (e.g., many users visited location A and will visit location B), or a combination of the two. Mobile device 102 can determine a current location. Mobile device 102 can determine historical locations visited. Mobile device 102 can sort the historical locations from most frequently visited to least frequently visited.

Mobile device 102 can join (624) data sets of predicted LOIs, current location, and historical locations in that order.

Mobile device 102 can generate (626) clusters. To generate a cluster C1, mobile device can start from a LOI designated as a most interesting LOI. Mobile device 102 can designate a sooner prediction as the most interesting LOI. Mobile device 102 can designate the most interesting LOI as an initial centroid of the cluster C1. Mobile device 102 can merge an LOI into the cluster C1 upon determining that the LOI is located within a cluster area around the centroid of cluster C1. The cluster area can have a radius (e.g., 50 kilometers) that represents a geographic region that a user might travel around a given LOI in a given day. If mobile device 102 determines that an LOI is not contained within cluster area of cluster C1 or of another cluster, mobile device 102 can generate a new cluster around that LOI.

Mobile device 102 can erase (628) clusters that have not been visited recently (e.g., within the last X number of hours).

Mobile device 102 can identify (630) a specified number (e.g., 200) of venues that are located closest to any cluster. Mobile device can prefetch venue data for those venues. Mobile device can filter out venues that are located beyond a given radius (e.g., 200 kilometers) that represents the maximum distance that a user would likely travel within a day.

Mobile device 102 can fetch (632) venue data for the identified venues. Fetching the venue data can include canceling any pending download tasks for venues that are not in a list of identified venues (e.g., that of a prior venue data prefetch). Mobile device 102 can instruct an operating system of mobile device 102 to download the venue data. The instruction or instructions can specify criteria of the download. The criteria can include, for example, power requirements, availability of cellular data, availability of hotspots, etc. Mobile device 102 can then use holistic knowledge of ongoing network activities to prioritize and optimize a time when the download will occur.

Mobile device 102 may visit a location and use data for that location where mobile device 102 has not downloaded the data fully. Mobile device 102 can promote a task that uses the data. The task can use data that mobile device 102 has already downloaded if the download is partially complete. Mobile device 102 can ignore data that has been recently prefetched. Mobile device 102 can download missing data that the prefetch did not cover.

Exemplary Mobile Device Architecture

Figure 7:
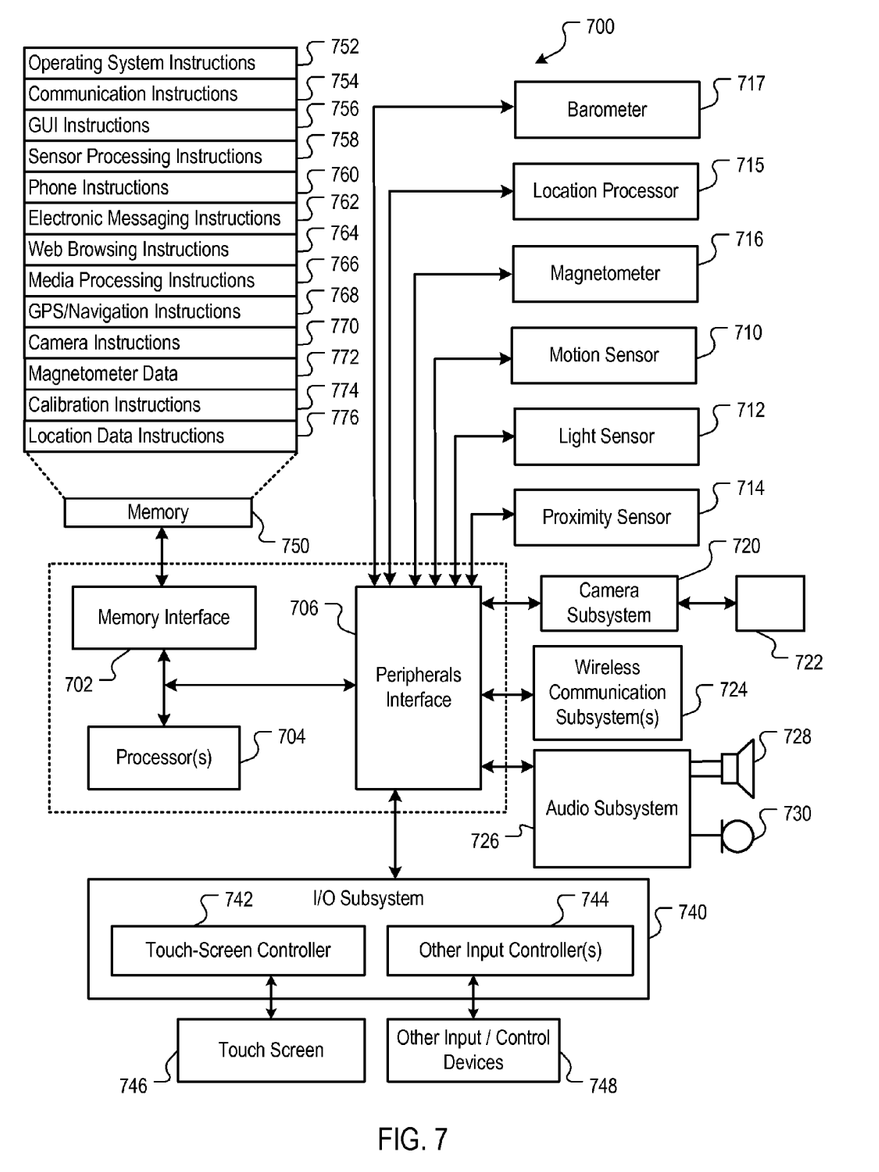
FIG. 7 is a block diagram illustrating an exemplary device architecture of a mobile device implementing the features and operations described in reference to FIGS. 1-6.

FIG. 7 is a block diagram of an exemplary architecture 700 for mobile device 102. A mobile device (e.g., mobile device 102) can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors, baseband processors, and wireless processors. The various components in mobile device 102, for example, can be coupled by one or more communication buses or signal lines.

Sensors, devices and subsystems can be coupled to peripherals interface 706 to facilitate multiple functionalities. For example, motion sensor 710, light sensor 712 and proximity sensor 714 can be coupled to peripherals interface 706 to facilitate orientation, lighting and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Motion sensor 710 can include one or more accelerometers configured to determine change of speed and direction of movement of the mobile device. Barometer 717 can include one or more devices connected to peripherals interface 706 and configured to measure pressure of atmosphere around the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi™ or WiMax™ network and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions. Audio subsystem 726 can be configured to receive voice commands from the user.

I/O subsystem 740 can include touch surface controller 742 and/or other input controller(s) 744. Touch surface controller 742 can be coupled to a touch surface 746 or pad. Touch surface 746 and touch surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 746. Touch surface 746 can include, for example, a touch screen.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch surface 746; and a pressing of the button for a second duration that is longer than the first duration may turn power to mobile device 102 on or off. The user may be able to customize a functionality of one or more of the buttons. The touch surface 746 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-relate processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can store location data instructions 776 that, when executed, can cause processor 704 to perform operations of example processes 600 and 620 as described above in reference to FIGS. 6A and 6B.

Each of the above identified instructions and applications can correspond to a set of instructions for performing one or more functions described above. These instructions need not be implemented as separate software programs, procedures or modules. Memory 750 can include additional instructions or fewer instructions. Furthermore, various functions of the mobile device may be implemented in hardware and/or in software, including in one or more signal processing and/or application specific integrated circuits.

Example Operating Environment

Figure 8:
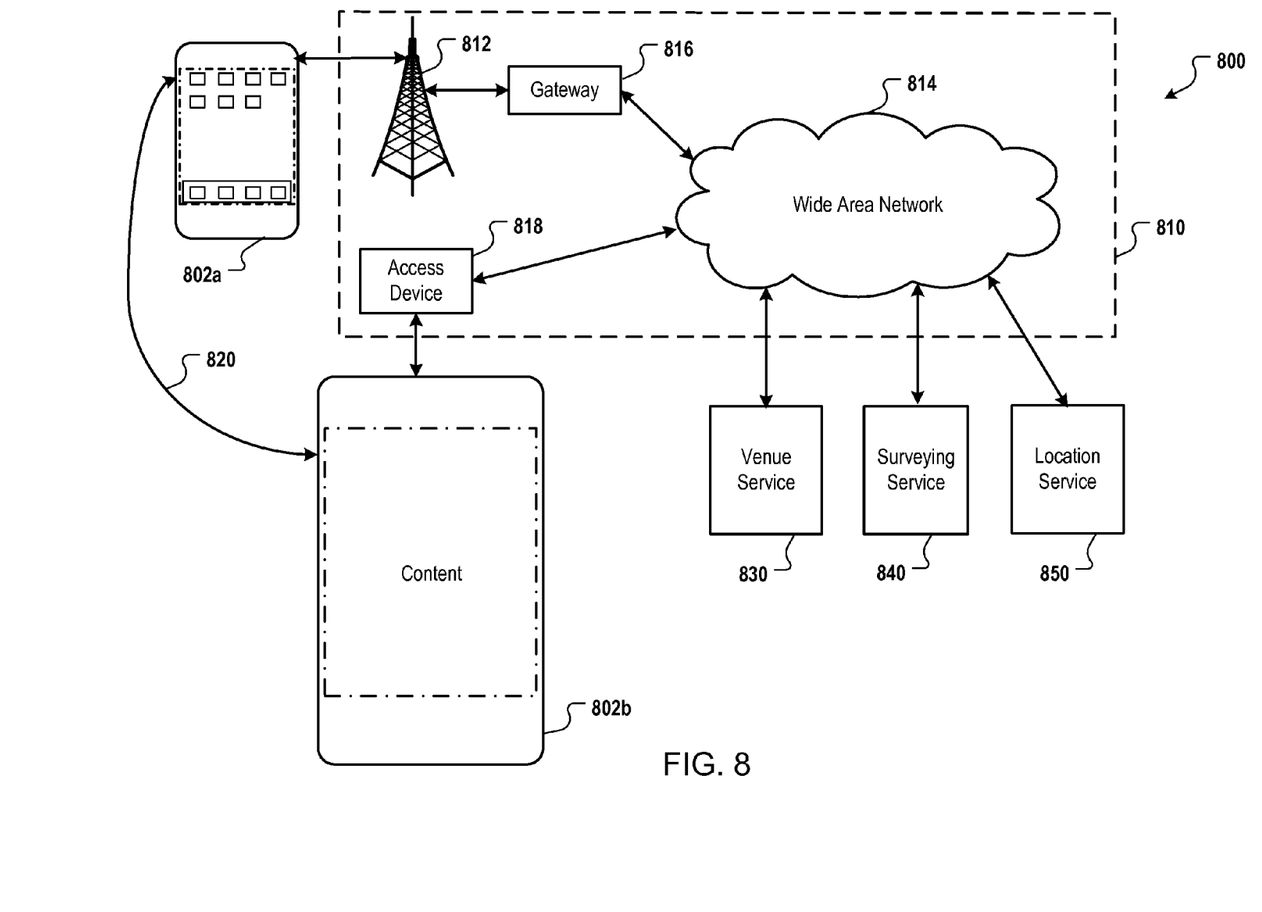
FIG. 8 is a block diagram of an exemplary network operating environment for the mobile devices of FIGS. 1-7.

FIG. 8 is a block diagram of an exemplary network operating environment 800 for the mobile devices of FIGS. 1-7. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access point, can provide communication access to the wide area network 814. Each of mobile devices 802a and 802b can be mobile device 102.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830, 840, and 850 over the one or more wired and/or wireless networks. For example, one or more venue services 830 can provide venue information to a location server, or to mobile devices 802a and 802b directly, from a venue data source. The venue information can include venue identifiers associated with venue maps. Survey service 840 can receive survey data from one or more sampling devices and provide the survey data to location server 128. Location server 128 can provide location service 850. Location service 850 can include providing venue maps and location fingerprints generated from survey data to mobile devices 802a and 802b.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   determining, by a mobile device during a location data prefetch by the mobile device from a location server, a cluster of one or more locations of interest predicted to be visited by a user of the mobile device before a scheduled time of a next location data prefetch, a size of the cluster corresponding to a time span between a time of the location data prefetch and the scheduled time of the next location data prefetch;
   requesting location data from the location server using the one or more locations of interest in the cluster prior to visiting the one or more locations of interest by the user, the location data including data specific to each location of interest; and
   performing, by the mobile device and based on the location data, a task that is specific to a location of interest among the one or more locations of interest upon determining that the mobile device is visiting the location of interest.

2. The method of claim 1, wherein determining the cluster of one or more locations of interest is based on a user movement radius, wherein the user movement radius corresponds to a distance that the user is able to travel in the time span.

3. The method of claim 1, wherein the data specific to each location of interest includes a respective location fingerprint data of each location of interest and a venue map of each location of interest, the location fingerprint data for each location of interest including expected wireless signal measurements at various portions of the respective location of interest.

4. The method of claim 1, wherein determining the cluster and requesting the location data occur periodically at prefetch time intervals determined by a download subsystem using one or more system metrics.

5. The method of claim 1, wherein performing the task comprises estimating a location of the mobile device inside a venue located at the location of interest being visited.

6. The method of claim 5, comprising presenting for display on the mobile device a map of the venue and presenting for display the location inside the venue on the map.

7. A mobile device, comprising:
   one or more processors; and
   a non-transitory computer-readable medium storing instructions that, when executed by the one or more processors, cause the one or more processors to perform operations comprising:
   determining, by the mobile device during a location data prefetch by the mobile device from a location server, a cluster of one or more locations of interest predicted to be visited by a user of the mobile device before a scheduled time of a next location data prefetch, a size of the cluster corresponding to a time span between a time of the location data prefetch and the scheduled time of the next location data prefetch;

requesting location data from the location server using the one or more locations of interest in the cluster prior to visiting the one or more locations of interest by the user, the location data including data specific to each location of interest; and performing, based on the location data, a task that is specific to a location of interest among the one or more locations of interest upon determine that the mobile device is visiting the location of interest.

8. The device of claim 7, wherein performing the task comprises estimating a location of the mobile device inside a venue located at the location of interest being visited.

9. The device of claim 7, wherein determining the cluster of one or more locations of interest is based on a user movement radius, wherein the user movement radius corresponds to a distance that the user is able to travel in the time span.

10. The device of claim 7, wherein the data specific to each location of interest includes a respective location fingerprint data of each location of interest and a venue map of each location of interest, the location fingerprint data for each location of interest including expected wireless signal measurements at various portions of the respective location of interest.

11. The device of claim 7, wherein determining the cluster and requesting the location data occur periodically at prefetch time intervals determined by a download subsystem using one or more system metrics.

12. At least one non-transitory computer-readable medium storing instructions that, when executed by one or more processors of a mobile device, cause the one or more processors to perform operations comprising:

determining, by the mobile device during a location data prefetch by the mobile device from a location server, a cluster of one or more locations of interest predicted to be visited by a user of the mobile device before a scheduled time of a next location data prefetch, a size of the cluster corresponding to a time span between a time of the location data prefetch and the scheduled time of the next location data prefetch;

requesting location data from the location server using the one or more locations of interest in the cluster prior to visiting the one or more locations of interest by the user, the location data including data specific to each location of interest; and performing, based on the location data, a task that is specific to a location of interest among the one or more locations of interest upon determine that the mobile device is visiting the location of interest.

13. The non-transitory computer-readable medium of claim 12, wherein determining the cluster of one or more locations of interest is based on a user movement radius, wherein the user movement radius corresponds to a distance that the user is able to travel in the time span.

14. The non-transitory computer-readable medium of claim 12, wherein the data specific to each location of interest includes a respective location fingerprint data of each location of interest and a venue map of each location of interest, the location fingerprint data for each location of interest including expected wireless signal measurements at various portions of the respective location of interest.

15. The non-transitory computer-readable medium of claim 12, wherein determining the cluster and requesting the location data occur periodically at prefetch time intervals determined by a download subsystem using one or more system metrics.

* * * * *

UNITED STATES PATENT AND TRADEMARK OFFICE
CERTIFICATE OF CORRECTION

| | |
|---|---|
| PATENT NO. | : 9,838,848 B2 |
| APPLICATION NO. | : 14/866769 |
| DATED | : December 5, 2017 |
| INVENTOR(S) | : Vitali Lovich et al. |

It is certified that error appears in the above-identified patent and that said Letters Patent is hereby corrected as shown below:

In the Claims

In Column 13, Line 13, Claim 7, delete "determine" and insert -- determining --, therefor.

In Column 14, Line 17, Claim 12, delete "determine" and insert -- determining --, therefor.

Signed and Sealed this
Seventh Day of May, 2019

Andrei Iancu
*Director of the United States Patent and Trademark Office*